INVENTOR
ANDREW TRUHAN
BY Stowell & Stowell
ATTORNEYS

INVENTOR
ANDREW TRUHAN

BY Stowell & Stowell

ATTORNEYS

United States Patent Office 3,424,231
Patented Jan. 28, 1969

3,424,231
ENVIRONMENTAL CHAMBER
Andrew Truhan, R.D. 3, Box 392T,
Somerset, N.J. 08873
Filed Mar. 23, 1967, Ser. No. 625,527
U.S. Cl. 165—19     4 Claims
Int. Cl. F24f 3/14; F28f 25/06, 27/00

ABSTRACT OF THE DISCLOSURE

A controlled temperature and humidity chamber having a fan for circulating a stream of gas from the chamber through a temperature and humidity regulating unit having a liquid sump with heating and cooling coils submerged therein. Control is provided to maintain the sump at a desired temperature by suitable actuation of the heating and/or cooling coils and the liquid is sprayed into the gas stream to regulate the temperature and humidity thereof. The regulated gas is then passed through a final heating unit and recirculated through the chamber.

Cross references to related applications

This application is a continuation-in-part of application Ser. No. 450,073, filed Apr. 22, 1965, now abandoned.

Background of the invention

This invention relates to improved environmental chambers and in particular to chambers which will provide a wide range of controlled environmental conditions of, for example, temperature and humidity.

Chambers of the foregoing type are very desirable for the study of chemicals, pharmaceuticals, plastics, rubbers, bacteria, paints, packaging materials, food products, electrical and electronic products, and the like.

Summary of the invention

This invention provides a system wherein a large volume chamber may be relatively uniformly maintained within wide limits at a predetermined temperature and humidity.

Other objects and advantages of the invention are provided by a temperature and humidity control chamber comprising a compartment having top, bottom. and side walls; at least a pair of the opposed walls of said compartment having gas permeable panels therein; a gas inlet plenum chamber positioned in coextensive relationship to one of the panels exteriorly of the compartment; an outlet plenum chamber positioned in coextensive relationship to the other of the panels exteriorly of the compartment; a gas treating chamber communicating at one end with the outlet plenum chamber and at the other end with the inlet plenum chamber; gas humidifying, cooling and liquid removing means in said gas treating chamber; fan means for directing gas serially through the gas treating chamber, the inlet plenum chamber, across the compartment and to the outlet plenum chamber; and gas heating means arranged in the inlet plenum chamber and in the flow path of the gas therethrough.

Brief description of the drawing

The invention will be particularly described with reference to the following detailed description of preferred embodiments of the invention when considered together with the attached drawing in which.

Description of the preferred embodiment

Figure 1:
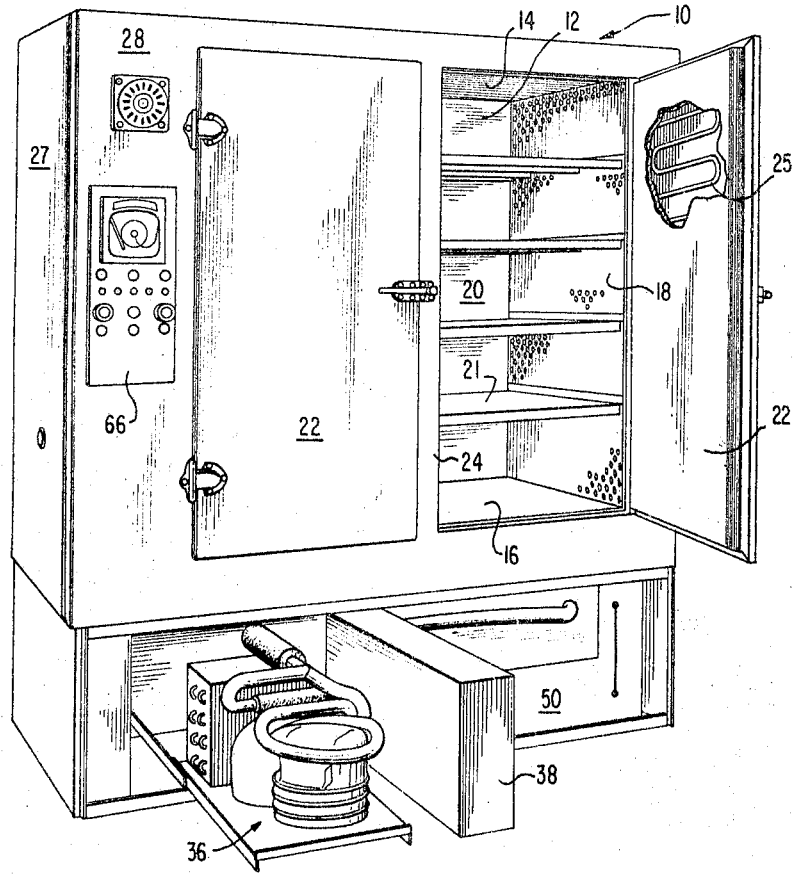
FIGURE 1 is a perspective view of a controlled environmental compartment constructed in accordance with the teachings of this invention.
Figure 3:
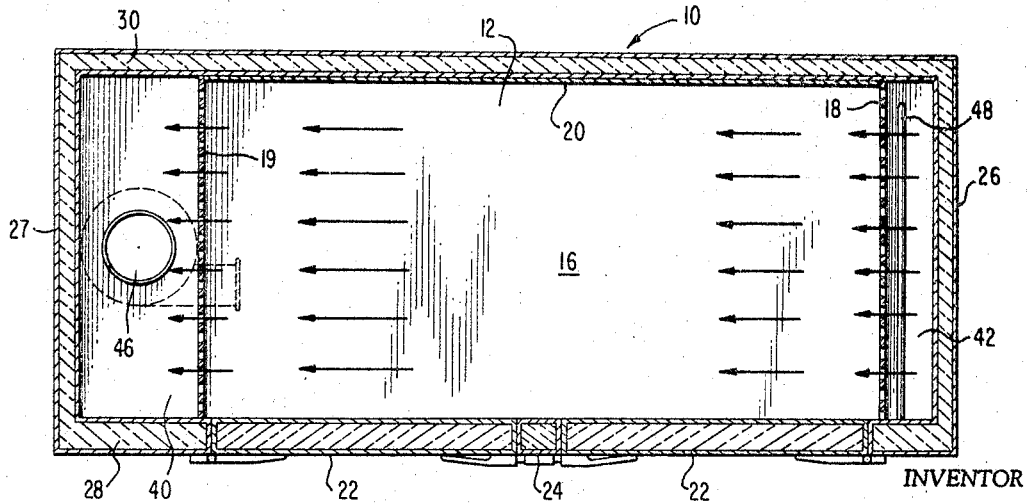
FIGURE 3 is a horizontal sectional view taken along the lines 3—3 of FIGURE 2.

Referring to the drawings and in particular to FIGURE 1, 10 generally designates a housing for enclosing an improved temperature and humidity controlled chamber apparatus in accordance with this invention. The cabinet 10 encloses a chamber 12 which is defined by top and bottom walls 14 and 16 respectively, perforate side walls 18 and 19 and a back wall 20. A plurality of material supporting horizontal shelves 21 are disposed in the chamber 12. The front portion of the chamber 12 is enclosed by a pair of hinged doors 22 which swing outwardly on either side of a center post 24.

The cabinet 10 comprises double walled, insulation-filled side panels 26 and 27, disposed in spaced relationship to the perforate side walls 18 and 19 of the chamber 12, and double walled, insulation-filled front and back panels 28 and 30 respectively. Double-walled, insulation-filled top and bottom panels 32 and 34 (FIGURE 2) complete the enclosure formed by the cabinet 10.

Heating coils 25 are disposed within the doors 22 to provide means to control the temperature of the inner surfaces thereof to thereby prevent condensation moisture thereon due to temperature differentials between these surfaces and the interior of the chamber 12.

A refrigeration unit, shown generally at 36, is mounted in the cabinet 10 beneath the chamber 12 on a movable shelf (shown in an extended, servicing position in FIGURE 1). An insulated wall 38, disposed adjacent the refrigeration unit 36, is movable therewith.

Referring now more particularly to FIGURES 2 through 5 of the drawings, the shelves 21 have been omitted for purposes of clarity. It is seen that the space between the side wall 19 and the side panel 27 forms an exit plenum chamber 40 while the corresponding space between the side wall 18 and the side panel 26 forms an inlet plenum chamber 42. A transverse channel 44, formed in conjunction with the bottom wall 16 of the chamber 12, interconnects the exit plenum chamber 40 and the inlet plenum chamber 42. A fan or blower 46 is disposed in the exit chamber 40 in communication with the channel 44 to circulate the gas in the chamber 12 as is shown by the arrows in FIGURES 2 and 3. The inlet chamber 42 has disposed therein a heating coil 48 connected, through a control 49, to a suitable source of electric power (not shown). A temperature sensing device 51, located in the chamber 12, is connected to the control 49.

A fluid holding tank 50 is located subadjacent the channel 44 and is in communication therewith through openings 52 and 54. The opening 54 has, provided therein, a filter 56 of any type standard in the art to remove impurities from the gas flowing therethrough and droplets of liquid which may be suspended in the gas stream. A valve means, illustrated as a movable flapper valve 58, is disposed in the channel 44 between the opening 52 and the opening 54 whereby a portion of the gas stream passing along the channel 44 may be bypassed from a gas treating zone 60 in the tank 50 and recirculated directly to the inlet plenum 42. This valve means provides additional control for the controlled environment chamber as will be described below.

Arranged in the tank 50 are a heater coil 62, connected to a suitable source of electric power (not shown) through a pair of manual circuit breakers 64, the heat output of which is governed by a control device 66 (shown schematically in FIGURE 2) which is connected to a source of low voltage supply (not shown). A sensing element, which may comprise a thermistor 68, is disposed in the tank 50 and connected to the control 66. The coil 62 and sensing element 68 are submerged in a water sump 70 formed in the tank 50.

A cooling coil 72, connected to the refrigeration apparatus 36, is also submerged in the sump 70 to provide cooling for the fluid therein as required. The refrigeration unit 36 is also connected to the control 66 in such a manner that, by suitable adjustment of the control device 66, heat may be added to the sump 70 through the heating coil 62, or removed therefrom through the cooling coil 72 to maintain a desired temperature therein. Devices suitable for achieving control are standard in the art and, since the device per se does not constitute a portion of this invention, further detailed description thereof is not included herein.

An electric pump 74 communicates with a plurality of spray nozzles 76 disposed in the gas treatment zone 60 and with the liquid sump 70 whereby gas humidifying and temperature conditioning liquid is in part continuously recirculated.

The aforedescribed insulated walls help reduce to a minimum heat transfer between the chamber 12 and the ambient atmosphere. Such insulation may be of any type standard in the art such as foam polyurethane, glass wool or the like or may comprise an evacuated area between the aforedescribed double walls.

While no particular form of perforate wall is illustrated, a hardboard wall having one quarter inch diameter perforations on, for example, one half inch centers, would provide satisfactory uniform gas flow through the chamber.

The heating coils 48 positioned in the inlet plenum chamber 42 are conventional electric coils connected to a suitable source of electric current through a thermostat means (not shown) whereby the temperature of the coils may be suitably adjusted and maintained to thereby finally adjust the temperature and humidity of the gas stream to the desired value immediately prior to entrance thereof in the chamber. This final adjustment provides means to closely control the properties of the gas flow in the chamber without the requirement of predicting variations due to duct loss, heat transfer or ambient conditions.

Figure 2:
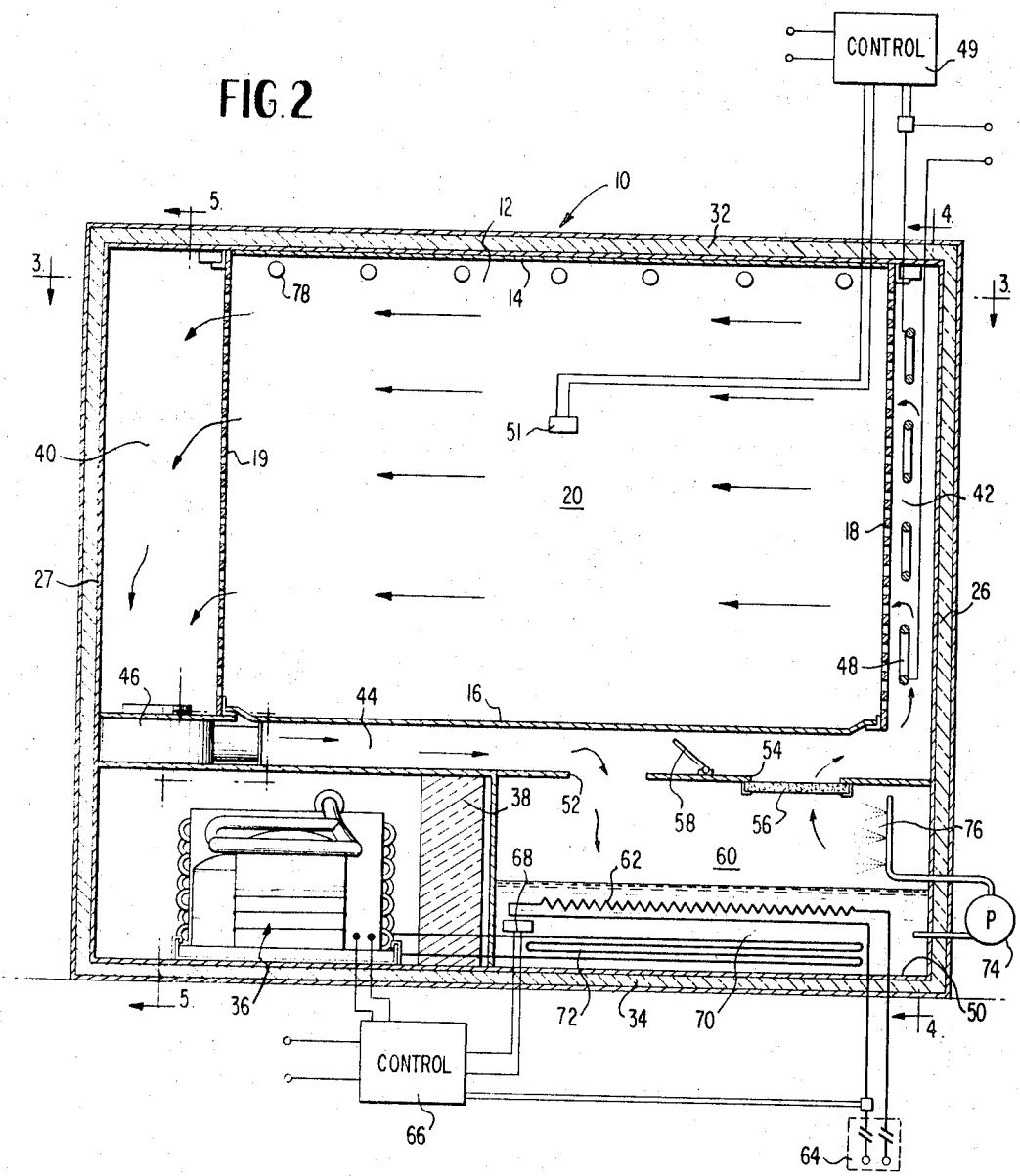
FIGURE 2 is a vertical sectional view through the compartment of FIGURE 1.
Figure 5:
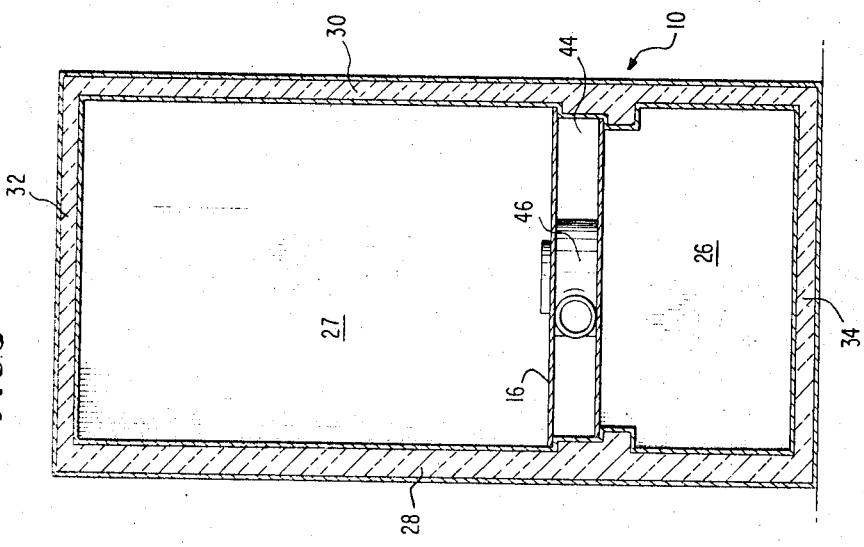
FIGURE 5 is a vertical sectional view taken along the lines 5—5 of FIGURE 2.
Figure 4:
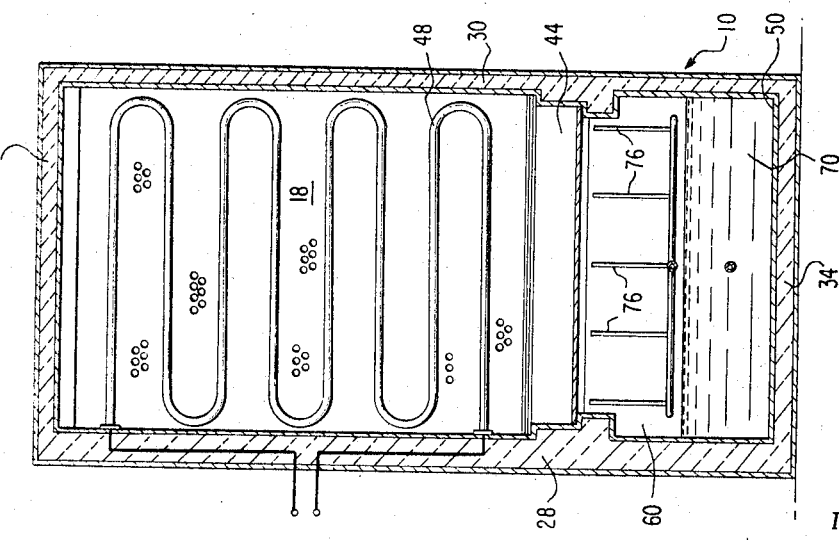
FIGURE 4 is a vertical sectional view taken along the lines 4—4 of FIGURE 2.

As illustrated in FIGURE 2, a plurality of lights, illustrated as fluorescent lights 78, may be mounted adjacent the top wall 14 of the chamber 12. These lights are used, not only to illuminate the compartment, but also to provide a desired amount of actinic or ultra-violet light for use in conducting certain experiments which may be desired to be carried out in a controlled environment.

During use of the controlled environment chamber of this invention, the material to be subjected to the controlled environment is placed in the chamber 12, on the shelves 21 or on racks or like structure which will permit storage of the material without materially interferring with the horizontal movement of air as illustrated by the direction of arrows.

In operation of the device, the temperature regulating controls 49 and 66 are energized. The pump 74 and fan 46 are then energized to initiate circulation of gas through the chamber 12 and liquid through the gas treating zone 60. Bypassed gas flowing through the gas treating zone 60 is saturated by the liquid sprayed from the nozzles 76 and is thereby humidified and simultaneously brouht to a temperature condition proximate that in the sump 70. The gas stream then is passed through the filter 56, into the inlet plenum 42, through the heating coils 48 to finally adjust the temperature and the relative humidity of the gas stream to the values desired in the chamber 12. By suitably controlling the quantity of the gas stream which is to flow through chamber 58 and to become saturated at the predetermined temperature of the liquid in sump 70, the relative humidity and the final temperature of the gas stream after passing the heating coils 48 is critically maintained. The gas stream then flows through the perforated wall 18, sweeping uniformly across the chamber 12 and to the exit plenum chamber 40.

Where lights such as 78 are installed in the chamber, a certain amount of heat would be added to the gas stream. However, by suitably regulating the amount of heat added to the gas stream by the heating coils 48, and by having a substantial volume of gas flowing constantly through the chamber 12, very uniform temperature and humidity may be obtained throughout the compartment. Where the desired humidity and temperature cannot be fully maintained by the steps of saturating and heating the gas stream, the valve 58 may be adjusted to permit a predetermined portion of the air flowing in the channel 44 from the chamber 12 to recirculate through the heating coils 48. This bypassed, non-rehumidified air mixing with the gas stream flowing from the gas treating zone 60 provides a further measure of control for the chamber.

Through the expedient of the present invention, test chambers have been constructed that are capable of maintaining the temperature within the chamber 12 at plus or minus .25° F. and at a humidity within plus or minus .50% of the control points; the test chamber operating at the control points of 90° F. drybulb temperature and 90% relative humidity.

It has also been found that substantially equivalent control can be maintained in ambient temperature ranges between 50 and 95° F.

From the foregoing description of the preferred embodiment of the present invention it can be seen that an improved environmental chamber has been provided. Throughout the discussion of the embodiment of the invention, the gas employed has been air, however, it will be apparent to those skilled in the art, that in a sealed, recirculating chamber type device as disclosed herein, an inert atmosphere such as nitrogen may be maintained in the chamber. Further, the gas may comprise a mixture of gases which may be high in oxygen, high in $CO_2$, high in CO and the like without departing from the principles of the invention. Further, in addition to injecting water into the gas stream to provide a saturated gas, other liquid treating agents may be employed so that an atmosphere having bactericidal or fungicidal properties may be maintained in the chamber.

It will be further recognized by those skilled in the art that, while specific controls for regulating the temperature of the coils 25 and 48 or the temperature of the heating and cooling coils 62 and 72 are not illustrated, a wide variety of commercial means including recorders may be employed with the environmental chamber of the invention.

It should therefore be understood that, within the scope of the appended claims, the invention may be practiced other than as specifically described.

What is new and therefore desired to be protected by Letters Patent of the United States is:

What is claimed is:

1. A temperature and humidity control compartment comprising a chamber having top, bottom and sidewalls; at least a pair of opposed walls of said chamber being gas permeable; a gas inlet plenum positioned in coextensive relationship with one of said pair of walls exteriorly of said chamber; an outlet plenum positioned in coextensive relationship to the other of said pair of walls exteriorly of said chamber; a gas treating chamber communicating with said outlet plenum and said inlet plenum; gas humidifying and temperature controlling means in said treating chamber; said humidifying and temperature controlling means including water spray means in the flow path of the gas stream to provide a gas saturated with water at a controlled temperature; fan means for directing gas through said gas treating chamber, said inlet plenum, across said chamber to said outlet plenum; and gas heating means positioned in the inlet plenum and being of a size to be substantially coextensive with its co-operating permeable wall and in the path of the flow gas to said temperature and humidity control compartment.

2. The invention defined in claim 1, including gas bypass means positioned between said inlet and outlet plenums and valve means for controlling the flow of gas therethrough.

3. The invention defined in claim 1, wherein said gas humidifying and temperature controlling means comprises a liquid sump; heating, cooling and temperature sensing means submerged in a said sump; a first control means connected to said heating, cooling and temperature sensing means to control the amount of heat supplied and removed from said sump according to a predetermined temperature as detected by said sensing means; means including a pump communicative with said sump and said liquid spray nozzle means disposed in said gas treating chamber to saturate the gas flowing therethrough with liquid from said sump.

4. The invention defined in claim 1, wherein said gas heating means includes a heating coil connected through a second control means to a source of electric power, a temperature sensing means disposed in said chamber, and connected to said second control to monitor the heat supplied by said coil to the gas stream immediately prior to entrance thereof into said chamber.

References Cited

UNITED STATES PATENTS

| | | | |
|---|---|---|---|
| 2,135,181 | 11/1938 | Jones | 165—21 |
| 3,245,461 | 4/1966 | Allington | 165—21 |
| 3,260,304 | 7/1966 | Rabechault | 165—19 |

ROBERT A. O'LEARY, *Primary Examiner.*

CHARLES SUKALO, *Assistant Examiner.*

U.S. Cl. X.R.

165—60; 236—44